United States Patent
Mohan et al.

(10) Patent No.: US 9,998,961 B2
(45) Date of Patent: Jun. 12, 2018

(54) APPARATUS AND METHODS OF ENHANCED MOBILITY MANAGEMENT

(71) Applicant: QUALCOMM Incorporated, San Diego, CA (US)

(72) Inventors: Siddharth Mohan, San Diego, CA (US); Rohit Kapoor, San Diego, CA (US); Haitong Sun, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 14/060,350

(22) Filed: Oct. 22, 2013

(65) Prior Publication Data

US 2014/0135010 A1    May 15, 2014

Related U.S. Application Data

(60) Provisional application No. 61/725,358, filed on Nov. 12, 2012.

(51) Int. Cl.
*H04W 36/00* (2009.01)
*H04W 36/18* (2009.01)

(52) U.S. Cl.
CPC ... *H04W 36/0083* (2013.01); *H04W 36/0072* (2013.01); *H04W 36/18* (2013.01)

(58) Field of Classification Search
CPC ......... H04W 36/0083; H04W 36/0072; H04W 36/18
See application file for complete search history.

(56) References Cited

U.S. PATENT DOCUMENTS

| 7,171,215 | B2  |    | 1/2007  | Khouaja et al. |
|-----------|-----|----|---------|----------------|
| 8,369,857 | B2  |    | 2/2013  | Dimou et al.   |
| 8,700,083 | B2  |    | 4/2014  | Yavuz et al.   |
| 2001/0055959 | A1 | * | 12/2001 | Shen ............... H04B 7/0811 455/277.1 |
| 2003/0119508 | A1 |   | 6/2003  | Gwon et al.    |
| 2003/0148765 | A1 | * | 8/2003  | Ma .............. H04W 36/32 455/438 |

(Continued)

FOREIGN PATENT DOCUMENTS

| CN | 102577515 A | 7/2012 |
| JP | 2010-521119 A | 6/2010 |

(Continued)

OTHER PUBLICATIONS

Taiwan Search Report—TW102139122—TIPO—dated Feb. 6, 2015.
International Search Report and Written Opinion—PCT/US2013/066437—ISA/EPO—dated Apr. 23, 2014 11 pages.

*Primary Examiner* — Mehmood B Khan
(74) *Attorney, Agent, or Firm* — Arent Fox, LLP

(57) ABSTRACT

Apparatus and methods of mobility management include identifying a target cell as an active set candidate. The apparatus and methods further include determining that a trigger adjustment condition exists, wherein the trigger adjustment condition triggers an adjustment of a timing value that indicates a sending time of a target cell add message to a serving cell. Moreover, the apparatus and methods include sending the target cell add message including the target cell to the serving cell based on determining that the trigger adjustment condition exists.

15 Claims, 9 Drawing Sheets

(56) References Cited

U.S. PATENT DOCUMENTS

| | | | |
|---|---|---|---|
| 2005/0192042 A1* | 9/2005 | Au | H04W 28/22 455/522 |
| 2005/0272425 A1* | 12/2005 | Amerga | H04B 1/70735 455/436 |
| 2007/0081492 A1 | 4/2007 | Petrovic et al. | |
| 2007/0287473 A1* | 12/2007 | Dupray | H04W 4/02 455/456.1 |
| 2008/0002759 A1* | 1/2008 | Cairns | H04B 1/712 375/148 |
| 2008/0261599 A1* | 10/2008 | Mohanty | H04W 36/0055 455/436 |
| 2009/0135754 A1* | 5/2009 | Yavuz | H04W 74/04 370/311 |
| 2009/0275337 A1* | 11/2009 | Maeda | H04W 36/18 455/442 |
| 2009/0304132 A1* | 12/2009 | Cairns | H04B 1/7117 375/347 |
| 2010/0105336 A1* | 4/2010 | Attar | H04W 72/02 455/67.11 |
| 2010/0246725 A1* | 9/2010 | Okuyama | H01Q 1/241 375/340 |
| 2011/0014874 A1* | 1/2011 | Cairns | H04B 1/7115 455/63.1 |
| 2011/0263262 A1 | 10/2011 | Min et al. | |
| 2011/0319028 A1 | 12/2011 | Magadi et al. | |
| 2012/0113797 A1* | 5/2012 | De Pasquale | H04B 7/0628 370/216 |
| 2012/0202482 A1 | 8/2012 | Katepalli et al. | |
| 2012/0289233 A1* | 11/2012 | Medbo | G01S 11/10 455/436 |
| 2013/0045771 A1* | 2/2013 | Martin | H04W 52/24 455/522 |
| 2013/0294265 A1* | 11/2013 | Peng | G01S 5/0215 370/252 |
| 2015/0078336 A1* | 3/2015 | Ding | H04W 36/0083 370/331 |

FOREIGN PATENT DOCUMENTS

| | | | |
|---|---|---|---|
| WO | WO-03001838 A1 | 1/2003 | |
| WO | WO-2007/107117 A1 | 9/2007 | |
| WO | WO-2008/112126 A1 | 9/2008 | |
| WO | WO-2009/023596 A2 | 2/2009 | |
| WO | WO-2009058069 A1 * | 5/2009 | |
| WO | WO 2009058069 A1 * | 5/2009 | H04W 64/006 |
| WO | WO 2011018616 A2 * | 2/2011 | H04W 36/0083 |
| WO | WO-2011018616 A2 * | 2/2011 | |
| WO | WO 2011019966 A2 * | 2/2011 | H04W 36/0072 |
| WO | WO-2011019966 A2 * | 2/2011 | |
| WO | WO-2011/123464 A1 | 10/2011 | |
| WO | WO-2012/109390 A1 | 8/2012 | |

\* cited by examiner

APPARATUS AND METHODS OF ENHANCED MOBILITY MANAGEMENT

CLAIM OF PRIORITY UNDER 35 U.S.C. § 119

The present application for patent claims priority to Provisional Application No. 61/725,358 entitled "APPARATUS AND METHODS OF ENHANCED MOBILITY MANAGEMENT" filed Nov. 12, 2012, and assigned to the assignee hereof and hereby expressly incorporated by reference herein.

BACKGROUND

Aspects of the present disclosure relate generally to wireless communication systems, and more particularly, to enhanced mobility management.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

It is noted that one problem with current implementations relates to failures during a cell change procedure when a user equipment is in communication with a network having a heterogeneous deployment including macro cells and small coverage cells (e.g., femto cells, pico cells, etc.).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of mobility management comprises identifying a target cell as an active set candidate. The method further comprises determining that a trigger adjustment condition exists, wherein the trigger adjustment condition triggers an adjustment of a timing value that indicates a sending time of a target cell add message to a serving cell. Moreover, the method comprises sending the target cell add message including the target cell to the serving cell based on determining that the trigger adjustment condition exists.

In another aspect, a computer program product comprising a computer-readable medium includes at least one instruction executable to cause a computer to identify a target cell as an active set candidate. The computer-readable medium further includes at least one instruction executable to cause the computer to determine that a trigger adjustment condition exists, wherein the trigger adjustment condition triggers an adjustment of a timing value that indicates a sending time of a target cell add message to a serving cell. Moreover, the computer-readable medium includes at least one instruction executable to cause the computer to send the target cell add message including the target cell to the serving cell based on determining that the trigger adjustment condition exists.

Further aspects include an apparatus for communication comprising means for identifying a target cell as an active set candidate. The apparatus further comprises means for determining that a trigger adjustment condition exists, wherein the trigger adjustment condition triggers an adjustment of a timing value that indicates a sending time of a target cell add message to a serving cell. Moreover, the apparatus comprises means for sending the target cell add message including the target cell to the serving cell based on determining that the trigger adjustment condition exists.

Additional aspects include a user equipment apparatus comprising a memory storing executable instructions and a processor in communication with the memory, wherein the processor is configured to execute the instructions to identify a target cell as an active set candidate. The processor is further configured to determine that a trigger adjustment condition exists, wherein the trigger adjustment condition triggers an adjustment of a timing value that indicates a sending time of a target cell add message to a serving cell. Moreover, the processor is configured to send the target cell add message including the target cell to the serving cell based on determining that the trigger adjustment condition exists.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to enhancing a mobility management procedure at a user equipment (UE) to provide expedited communication of a request message to a base station, and consequently receiving a response message from the base station, for adding a target cell to an active set of the UE. For example, various aspects of the disclosure address an issue in enhanced serving cell change (E-SCC), where the UE is delayed from sending an Event 1a message, and is thus unable to timely receive or decode an Active Set Update (ASU) message in response, thereby preventing a potential handover and causing call failures. Specifically, a delay in satisfying Event 1a criteria and transmitting Event 1a to the network prevents the active set update.

For example, during various points in time, a UE may travel from one geographical point to another. In such a case, the UE may travel in a zone including overlapping cells. That is, the UE may detect a base station having a sufficiently strong enough signal for it to be added to a set of handover candidates, e.g., an active set of the UE. However, issues may arise with communicating with the serving cell if the UE is traveling at or above a certain velocity or if the base station acting as the serving cell is too close in proximity to the target cell, especially when the serving and target cell, or vice versa, are a macro cell and a small coverage cell. Accordingly, the ASU message, which includes necessary pre-configuration information used for enabling serving cell switching, may not be successfully delivered to or received by the UE. As such, the present apparatus and methods are configured to initiate the transmission of the target cell add message (e.g., Event 1a message) at an earlier time based on certain aspects described herein.

Figure 1:
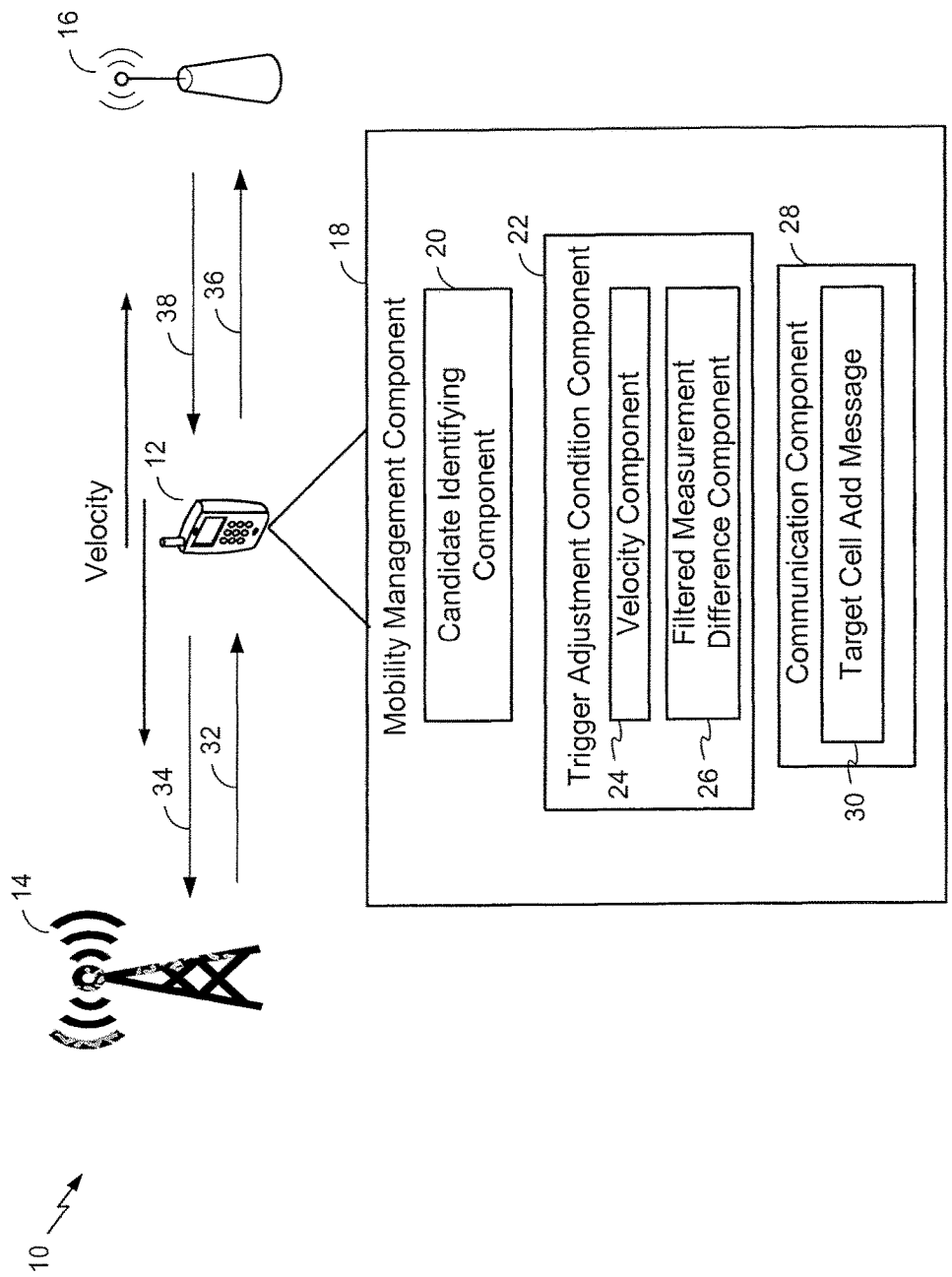
FIG. 1 is a schematic diagram of a user equipment performing a mobility management procedure in a heterogeneous network including a macro cell and a small coverage cell.

Referring to FIG. 1, in an aspect a wireless communication system 10 includes a UE 12 in communication coverage of at least macro base station 14 and small coverage base station 16. In one aspect, macro base station 14 may be the serving cell and the UE 12 may be moving towards the small coverage base station 16, e.g. the target cell, at a velocity. In another aspect, the small coverage base station 16 may be the serving cell and the UE 12 is moving towards the macro base station 14, e.g. the target cell. In yet other aspects, the UE 12 may not necessarily be moving, but may be in a coverage overlap area between a closely located set of the serving cell and the target cell, e.g. respective ones of the macro base station 14 and the small coverage base station 16, such that the UE 12 may be experience signal path loss from the serving cell. The velocity of the UE 12, or the close proximity of the two base stations relative to one another, or some combination of both, may prevent the UE 12 from completing a serving cell switch when the UE 12 operates without the benefit of the present apparatus and methods.

As used herein, the macro base station 14 may generate a cellular network or WWAN cell and/or sector, while the small coverage base station 16 may generate a substantially smaller cell and/or sector such as a picocell, a femtocell, a Wi-Fi or WLAN cell, or the like. Additionally, the macro base station 14 and small coverage base station 16 may operate according to any communication technology, such as, but not limited to, GSM, WCDMA, and/or LTE. In addition, the small coverage base station 16 may be a closed subscriber group (CSG) or other limited access base station.

In some examples, wireless communication between UE 12 and macro base station 14 may occur on one or more wireless links 32 and/or 34. In other aspects, wireless communication between UE 12 and small coverage base station 16 may occur on one or more wireless links 36 and/or 38. In a further aspect, macro base station 14 and/or small coverage base station 16 may have an associated network component, such as an access point, including a base station (BS) or NodeB, a relay, a peer-to-peer device, a radio network controller (RNC), an authentication, authorization and accounting (AAA) server, a mobile switching center (MSC), picocell, piconode, femtocell, femtonode, Wi-Fi access point, etc., that can enable UE 12 to communicate and/or that can establish and maintain a communication link, such as wireless links 32 and/or 34 with macro base station 14 and/or wireless links 36 and/or 38 with small coverage base station 16. In addition, UE 12 may be a multimode device, which may allow the UE to communicate with multiple technology type networks.

In addition, for purposes of the present disclosure the communication technology used for communication between one or more of UE 12, macro base station 14, and small coverage base station 16 may be of a 3G/4G technology type, such as, but not limited to, data optimized (DO), WCDMA, Time Division Synchronous Code Division Multiple Access (TDS-CDMA), or any other third-generation mobile communications technology. Additionally, in some examples, the communication technology may be a 2G technology type, such as, but not limited to, GSM, GPRS, or EDGE. Furthermore, example RAT types may include more advanced RATs, such as, but not limited to, Long-Term Evolution (LTE), Time-Division Long-Term Evolution (TD-LTE), or any other fourth-generation mobile communications technology. Alternatively or additionally, any other communication technology type may be used for such communication.

According to the present aspects, UE 12 may include a mobility management component 18, which may be configured to trigger the transmission of a target cell add message 30 to a base station (e.g., macro base station 14). In an aspect, the mobility management component 18 may alternatively or additionally be located at and/or maintained by a network entity, such as a network entity associated with macro base station 14 and/or small coverage base station 16. In an aspect, the mobility management component 18 includes a candidate identifying component 20, which may be configured to identify a target cell (e.g., small coverage base station 16) as an active set candidate. In some aspects, an active set candidate may be any base station and/or cell that may be considered suitable for handover. In an aspect, the identification may be made based on one or more communication characteristics of the target cell satisfying a set of criteria for sufficient two-way communication.

Additionally, mobility management component 18 may include a trigger adjustment condition component 22. For example, trigger adjustment condition component 22 may alternatively or additionally be located at and/or maintained by a network entity, such as a network entity associated with macro base station 14 and/or small coverage base station 16. The trigger adjustment condition component 22 may be configured to adjust a timing value associated with when target cell add message 30 can be sent to the serving cell (e.g., macro base station 14) based on the trigger adjustment condition.

For instance, the timing value may include, but is not limited to, at least one of filtered $EcpI_o$ time constant value, a time to trigger (TTT) value, or a cell individual offset (CIO) value. It should be noted that, as used herein, the term "EcpIo" may have the same meaning as "Ecp/Io," e.g., the ratio of pilot channel energy to total energy. In an aspect, the trigger adjustment condition component 22 may be configured to determine that a trigger adjustment condition exists. Whether the trigger adjustment condition exists may be determined in a number of ways.

In one aspect, the trigger adjustment condition component 22 may include velocity component 24, which may be configured to determine, either directly or indirectly, that a velocity of UE 12 is greater than or equal to a velocity threshold value. Based on the determined result, a timing value associated with when target cell add message 30 can be sent to the serving cell may be adjusted based on the velocity. For example, but not limited hereto, the adjusted timing value may be inversely proportional to the velocity of the UE 12.

That is, UE 12, and in particular, trigger adjustment condition component 22, may be configured to send target cell add message 30 to macro base station 14 when velocity component 24 detects or otherwise determines that the velocity of UE 12 meets and/or exceeds the velocity threshold value. As such, in order for UE 12 to obtain a response confirming an ASU (e.g., ASU message) from macro base station 14, mobility management component 18 may determine that due to the high velocity of UE 12 moving towards small coverage base station 16 and away from macro base station 14, a target cell add message 30 may be transmitted to macro base station 14. In such aspects, target cell add message 30 may be transmitted to macro base station 14 at a sufficiently earlier time in order to receive the response confirming an ASU (e.g., ASU message) from macro base station 14 before UE 12 moves out of coverage or otherwise is unable to receive the ASU message due to poor communication conditions with macro base station 14.

In further aspects, the trigger adjustment condition component 22 may include filtered measurement difference component 26 to determine a relative difference between filtered $EcpI_o$ measurements using different time constants, in order to determine which filtered $EcpI_o$ measurement to use in determining a condition to send target cell add message 30. For example, filtered measurement difference component 26 may be configured to calculate a first filtered $EcpI_o$ measurement with a first time constant value, calculate a second filtered $EcpI_o$ measurement with a second time constant less than a first time constant value, and determine an absolute value of a difference between the first and second filtered $EcpI_o$ measurements.

In such aspects, the second time constant value, being less than the first time constant value, is associated with a determined trigger adjustment condition that causes target cell add message 30 to be sent sooner, or otherwise to be expedited (e.g., relative to target cell add messages sent without such determinations at trigger adjustment condition component 22). Further, filtered measurement difference component 26 may compare the determined absolute value result to a difference value threshold. Subsequently, filtered measurement difference component 26 may use the second filtered $EcpI_o$ measurement for determining when to send the target cell add message when the difference is greater than or equal to the difference value threshold, which corresponds to a sensitivity for detecting a trigger adjustment condition.

In an aspect, the trigger adjustment condition triggers an adjustment of the timing value that manages or otherwise regulates the sending time of the target cell add message to the serving cell (e.g., macro base station 14). For example, in some aspects, the trigger adjustment condition may be a set of one or more conditions at UE 12, or a state of UE 12, corresponding to a situation in which UE 12 is in jeopardy of not receiving an active set update message from serving cell (e.g., macro base station 14) in response to a target cell add message 30 transmitted to the serving cell. Such a set of one or more conditions or a state of the UE includes, but is not limited to, one or more of a relatively high rate of increase in path loss, a relatively high rate of velocity moving away from a serving cell, a difference of filtered EcpIo measurements that violates a threshold value, a current location just inside of a coverage area of the serving cell combined with a movement in a direction away from the coverage area of the serving cell, or any other set of conditions or states that correspond to a high probability that without expediting the sending of the target cell add message 30 to the serving cell (e.g., macro base station 14), cell reselection to the target cell (e.g., small coverage base station 16) will fail as a result of a failure by the serving cell to obtain the active set update message. In such aspects, the high likelihood or probability of an expected active set update failure may be determined, for example, by the UE velocity or filtered EcpIo measurement comparisons, as described herein. Further, the trigger adjustment condition, when detected, causes UE 12 and/or mobility management component 18 to initiate an adjustment of the timing value that manages or otherwise regulates the sending time of the target cell add message to the serving cell (e.g., macro base station 14).

That is, the filtered measurement difference component 26 may be configured to determine, based on the filtered measurements, that UE 12 is currently and/or will experience poor communication conditions with macro base station 14 that would prevent UE 12 from receiving a response message confirming an ASU (e.g., ASU message) from macro base station 14. Accordingly, target cell add message 30 may be transmitted to macro base station 14 at a sufficiently earlier time in order to receive the response confirming an ASU (e.g., ASU message) from macro base station 14 before UE 12 moves out of coverage or otherwise is unable to receive the ASU message due to poor communication conditions with macro base station 14.

It should be noted that, in some aspects, the first filtered $EcpI_o$ measurement may be received from a network entity and the second filtered $EcpI_o$ measurement may be selected by the UE 12. However, in other aspects, the first filtered $EcpI_o$ measurement may be received or selected by the 12 and the second filtered $EcpI_o$ measurement may be received or selected by the network entity.

In an additional aspect, the mobility management component 18 may include a communication component 28, which may be configured to send the target cell add message 30 based on determining that the trigger adjustment condition exists. For instance, the communication component 28 may be configured to generate or otherwise receive the generated the target cell add message 30 and transmit to macro base station 14 to thereby prompt the reception of an active cell update in response. Moreover, mobility management component 18 may be configured to add the target cell (e.g., small coverage base station 16) to an active set in response to receiving the active cell update message. For example, but not limited hereto, the active set update may be in the form of an Event 1a or Event 1d message.

Thus, when the UE 12 is moving between macro base station 14 and small coverage base station 16, and/or when macro base station 14 and small coverage base station 16 are in close proximity, or a combination of both, UE 12 executing mobility management component 18 may speed up transmission of a target cell add message, and consequently receive an active set update message, thereby enabling UE 12 to perform a handover between the base stations and avoid a call failure.

In some aspects, UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Figure 2:
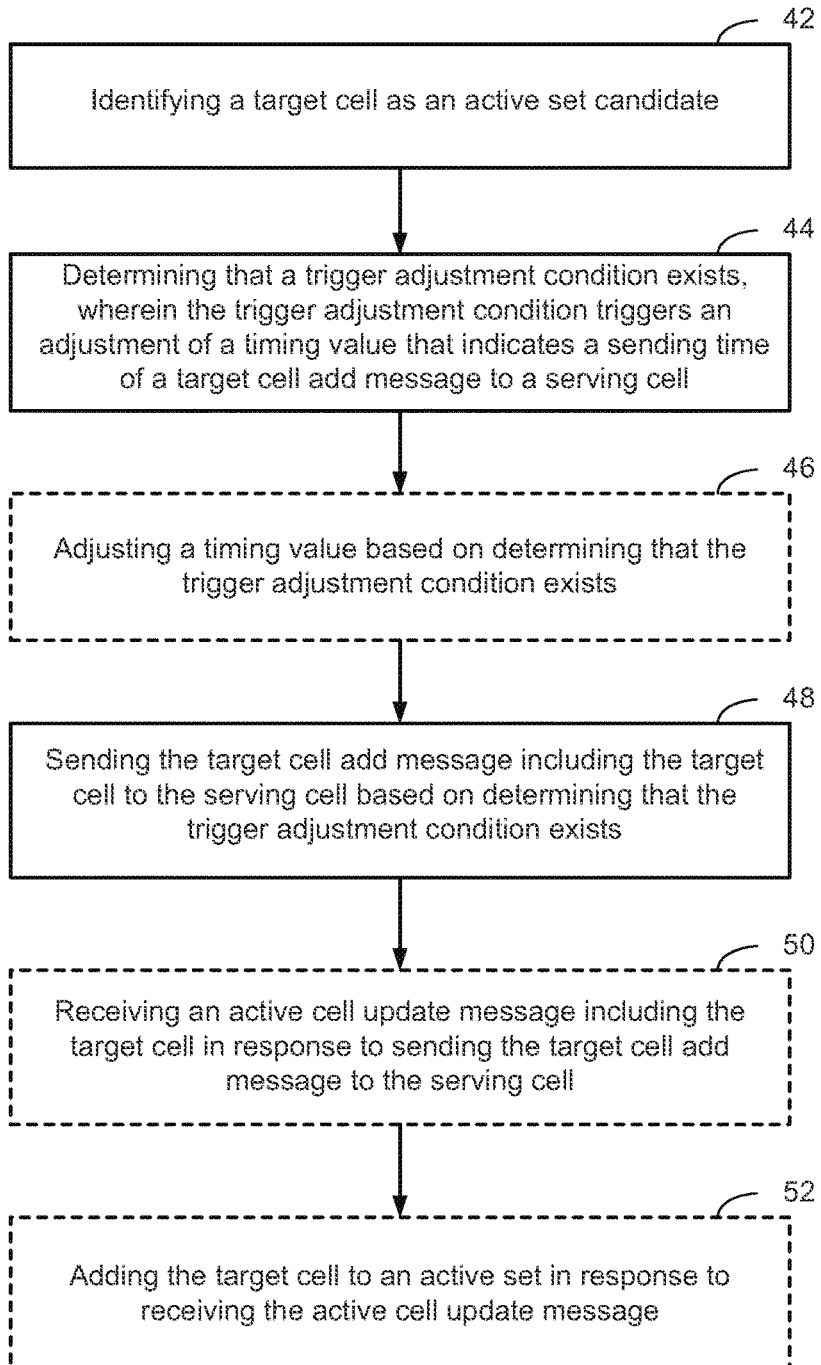
FIG. 2 is a flow chart of an aspect of a method of mobility management in accordance with an aspect of the present disclosure.
Figure 3:
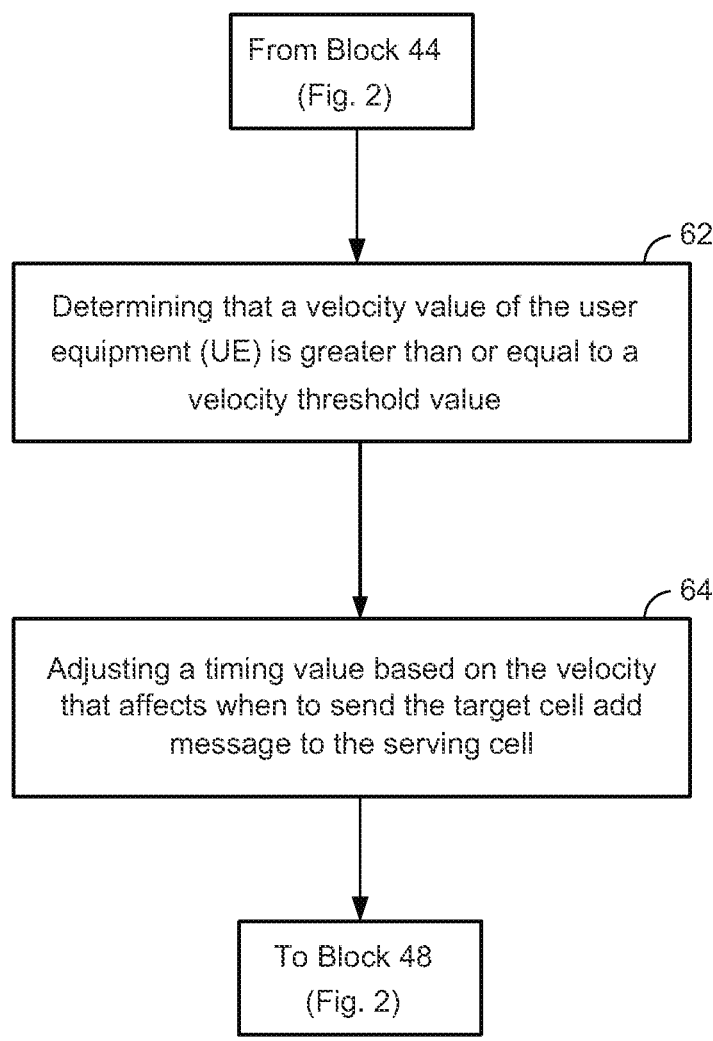
FIG. 3 is a flow chart of an aspect of a method of adjusting a timing value in accordance with an aspect of the present disclosure.
Figure 4:
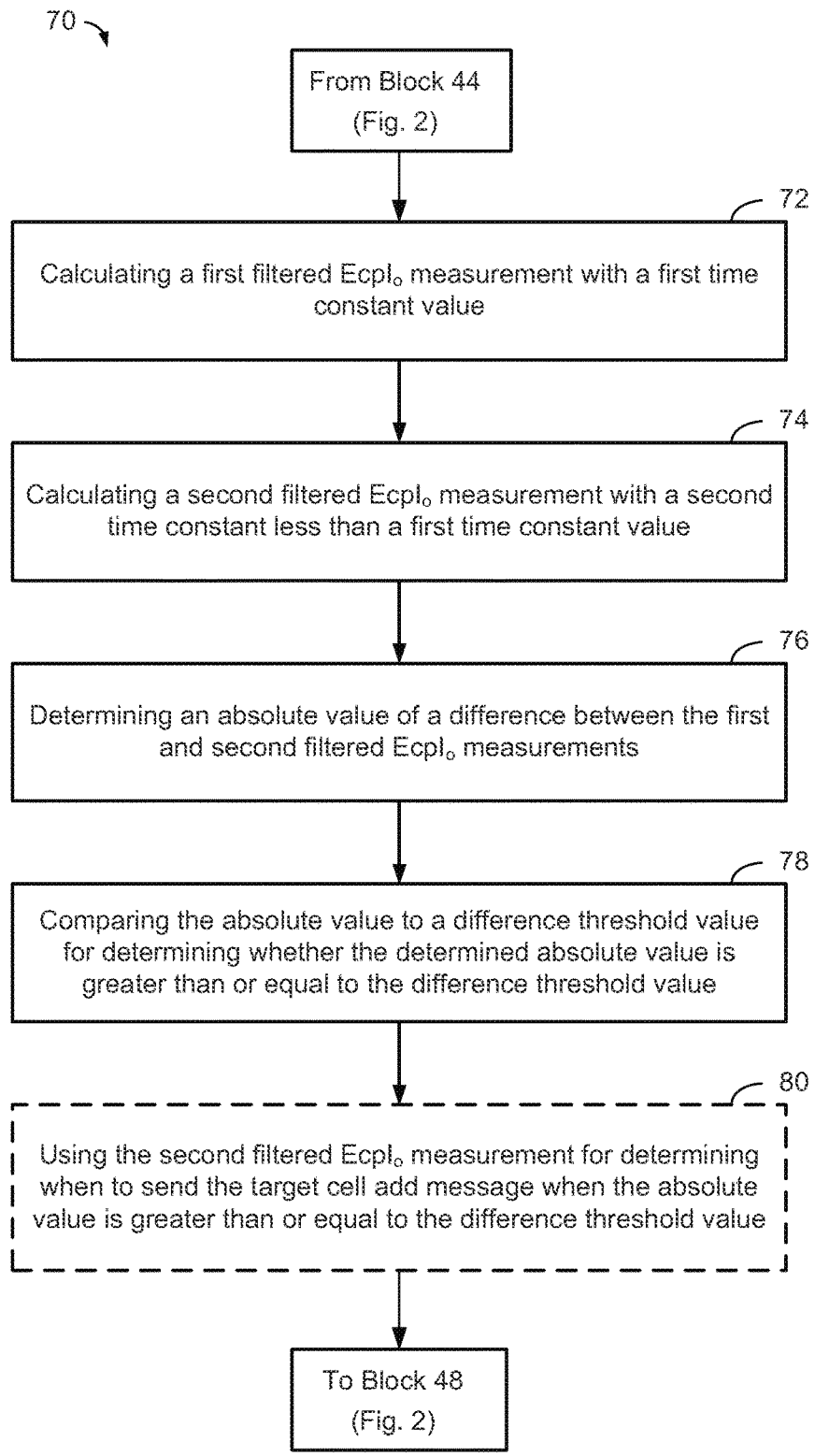
FIG. 4 is a flow chart of another aspect of a method of adjusting a timing value in accordance with an aspect of the present disclosure.

Referring to FIGS. 2-4, the methods are shown and described as a series of acts for purposes of simplicity of explanation. However, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

Referring to FIG. 2, an example methodology 40 for enhancing serving cell change by expediting the sending of a target cell add message is described. In an aspect, methodology 40 may be performed by components associated with a UE (e.g. UE 12, FIG. 1) and/or a network component associated with a first or second cell (e.g. macro base station 14 and/or small coverage base station 16, FIG. 1).

In an aspect, at block 42, method 40 includes identifying a target cell as an active set candidate. For example, as described herein, mobility management component 18 (FIG. 1) may execute candidate identifying component 20 to identify the target cell (e.g., small coverage base station 16) as an active set candidate. In some aspects, identification of the target cell as an active set candidate may be determined by UE 12 receiving a signal from a base station, e.g. one of macro base station 14 and small coverage base station 16 when UE 12 is being served by the other one, and comparing the received signal characteristics and/or other information carried by the signal with a preset or predetermined set of conditions that identify a sufficient candidate to which the UE 12 may be handed over. Additionally, at block 42, the target cell can be any device that enables communication with UE 12, such as a cell of macro base station 14 or small coverage base station 16.

At block 44, the method 40 may include determining that a trigger adjustment condition exists, wherein the trigger adjustment condition triggers an adjustment of a timing value that indicates a sending time of a target cell add message to a serving cell. For instance, as described herein, mobility management component 18 (FIG. 1) may execute trigger adjustment condition component 22 to determine that a trigger adjustment condition exists, wherein the trigger adjustment condition triggers an adjustment of a timing value that indicates a sending time of a target cell add message 30 to a serving cell (e.g., cell of macro base station 14, FIG. 1). In other words, trigger adjustment condition component 22 may determine the UE 12 is moving between macro base station 14 and small coverage base station 16, and/or when macro base station 14 and small coverage base station 16 are in close proximity, or a combination of both.

Further, at block 46, the method 40 may optionally include adjusting a timing value based on determining that the trigger adjustment condition exists. For instance, in an aspect, mobility management component 18 (FIG. 1) may execute at least one of velocity component 24 or filtered measurement difference component 26 to adjust a timing value based on determining that the trigger adjustment condition exists. In some aspects, the timing value may include at least one of a filtered $EcpI_o$ time constant value, a time to trigger value, or a cell individual offset value. In further aspects, the adjusted timing value triggers sending of the target cell add message at an earlier time relative to the timing value.

At block 48, the method 40 includes sending a target cell add message including the target cell to the serving cell based on determining that the trigger adjustment condition exists. For instance, in an aspect, UE 12 (FIG. 1) may execute communication component 28 to send a target cell add message 30 including the target cell (e.g., cell of small coverage base station 16) to the serving cell based on determining that the trigger adjustment condition exists.

Moreover, at block 50, the method 40 may optionally include receiving an active cell update message including the target cell in response to sending the target cell add message to the serving cell. For instance, in an aspect, UE 12 (FIG. 1) may execute communication component 28 to receive an active cell update message including the target cell in response to sending the target cell add message 30 to the serving cell. In some aspects, the active cell update message may be received from the serving cell (e.g., cell of macro base station 14, FIG. 1).

At block 52, the method 40 may optionally include adding the target cell to an active set in response to receiving the active cell update message. For instance, in an aspect, UE 12 (FIG. 1) may execute any one of the components of the mobility management component 18 to execute adding a target cell to an active set in response to receiving the active cell update message.

Referring to FIG. 3, an example methodology 60 for enhancing serving cell change by expediting sending of a target cell add message is described. Method 60 of FIG. 3 may be conducted at least in part with block 44 of FIG. 2. That is, method 60 may be used to determine that a trigger adjustment condition exists for expediting transmission of a target cell add message to a serving cell.

At block 62, method 60 includes determining that a velocity value of a UE is greater than or equal to a velocity threshold value. For example, at block 62, method 60 may determine whether $V_{UE} >= V_{th}$ where $V_{UE}$ may represent the instantaneous velocity of the UE and $V_{th}$ may represent the velocity threshold value. For instance, in an aspect, trigger adjustment condition component 22 (FIG. 1) may execute velocity component 24 to determine whether the velocity of the UE 12 is greater than or equal to the velocity threshold value. In some aspects, the velocity threshold value may be predetermined, actively updated, or updated in real time. In other aspects, the velocity of the UE may be determined indirectly, e.g., such as by a change over time in a measured value of $EcpI_o$. In further aspects, the UE may obtain the velocity value from other components or sensors, such as a GPS component.

At block 64, method 60 includes adjusting a timing value based on the velocity to change when to send the target cell add message. For instance, in an aspect, trigger adjustment condition component 22 (FIG. 1) may execute velocity component 24 to adjust the timing value based on determining that the UE 12 is traveling at a velocity that affects when to send the target cell add message (e.g., adjust the sending of target cell add message to an earlier time based on the fast moving UE condition). In some aspects, the adjusting of the timing value may include decreasing the timing value when the velocity value is greater than or equal to the velocity threshold value and increasing the timing value when the velocity value is less than the velocity threshold value.

Referring to FIG. 4, an example methodology 70 for enhancing serving cell change by expediting sending a target cell add message is disclosed. Method 70 of FIG. 4 may be conducted in part with block 44 in FIG. 2. That is, method 70 may be used to determine that a trigger adjustment condition exists for expediting transmission of a target cell add message to a serving cell. It should be understood that method 70, including each step as illustrated in FIG. 4, may be implemented in accordance with or using the filtered measurement difference component 26.

In one aspect, which should not be construed as limiting, at block 72, method 70 may include calculating a first filtered $EcpI_o$ measurement with a first time constant value. For example, as described herein, trigger adjustment condition component 22 (FIG. 1) may execute filtered measurement difference component 26 to calculate a first filtered $EcpI_o$ measurement with a first time constant value. Moreover, at block 74, method 70 may include calculating a second filtered $EcpI_o$ measurement with a second time constant less than a first time constant value. For example, as described herein, trigger adjustment condition component 22 (FIG. 1) may execute filtered measurement difference component 26 to calculate a second filtered $EcpI_o$ measurement with a second time constant less than a first time constant value.

At block 76, method 70 may include determining an absolute value of a difference between the first and second filtered $EcpI_o$ measurements. For example, as described herein, trigger adjustment condition component 22 (FIG. 1) may execute filtered measurement difference component 26 to determine an absolute value of a difference between the first and second filtered $EcpI_o$ measurements. Further, at block 78, method 70 may include comparing the absolute value to a difference threshold value for determining whether the absolute value is greater than or equal to the difference threshold value. In other words, via operation of method 70, the present aspects consider whether abs $(EcpIo_{filt1} - EcpIo_{filt2}) >= K$, where $EcpIo_{filt1}$ represents the first filtered $EcpI_o$ measurement with the first time constant value and $EcpIo_{filt2}$ represents the second filtered EcpIo measurement with the second time constant value, which may be less than the first time constant value. Additionally, K represents the difference threshold value. For instance, trigger adjustment condition component 22 (FIG. 1) may execute to compare the absolute value to the difference threshold value for determining whether the absolute value is greater than or equal to the difference threshold value.

At block 80, method 70 may optionally include using the second filtered $EcpI_o$ measurement for determining when to send the target cell add message when the absolute value is greater than or equal to the difference threshold value. For instance, trigger adjustment condition component 22 (FIG. 1) may execute to use the second filtered $EcpI_o$ measurement for determining when to send the target cell add message when the absolute value is greater than or equal to the difference threshold value. In some aspects, the second filtered $EcpI_o$ measurement triggers the sending of the target cell add message at an earlier time relative to the first filtered $EcpI_o$ measurement.

Figure 5:
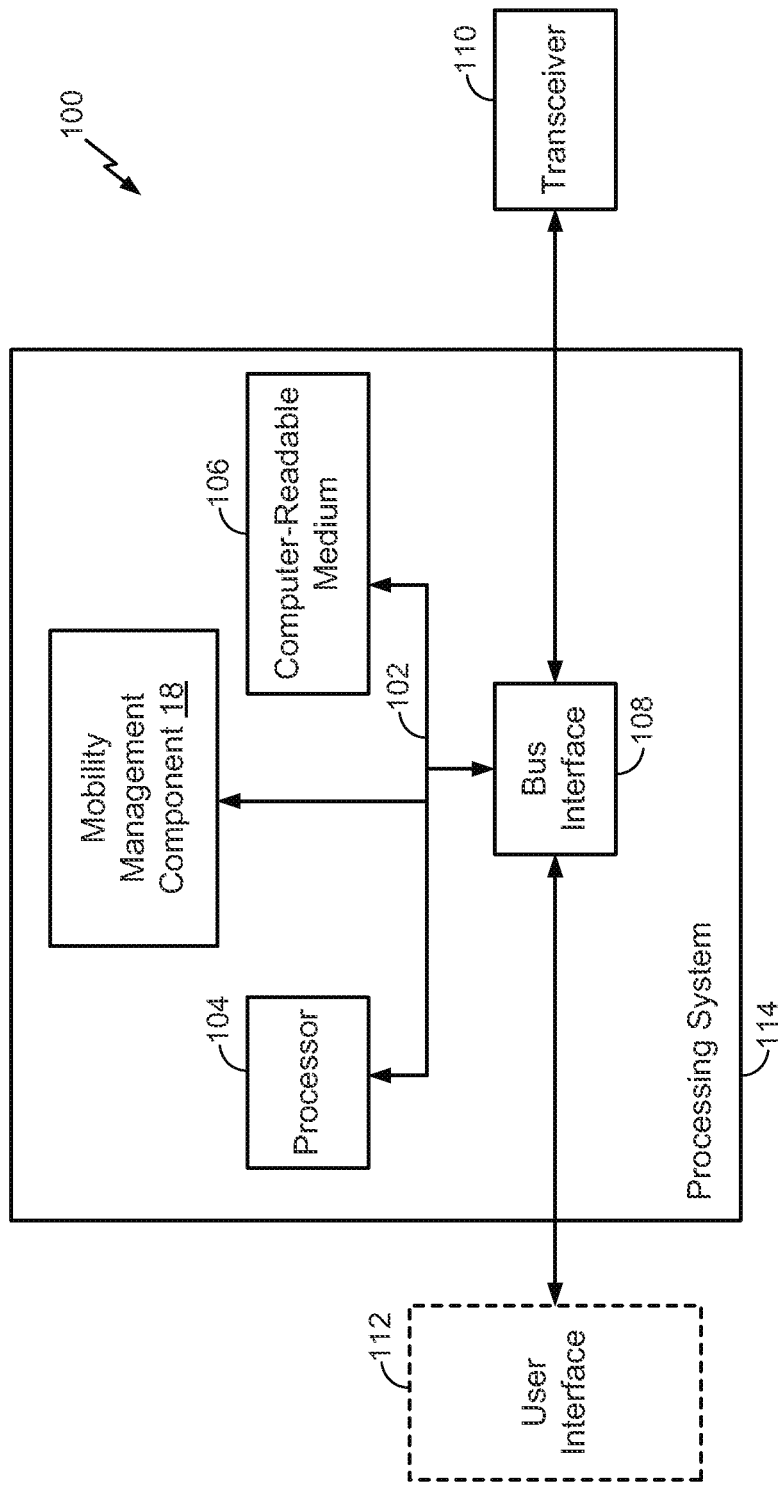
FIG. 5 is a block diagram illustrating an example of a hardware implementation for an apparatus in accordance with an aspect of the present disclosure.

FIG. 5 is a conceptual diagram illustrating an example of a hardware implementation for an apparatus 100 employing a processing system 114. In one aspect, any of UE 12 (FIG. 1) including mobility management component 18, or the one or more network entities, such as macro base station 14 (FIG. 1) and/or the optional small coverage base station 16 (FIG. 1) may be represented by a specially programmed or configured computer device 100. In this example, the processing system 114 may be implemented with a bus architecture, represented generally by the bus 102. The bus 102 may include any number of interconnecting buses and bridges depending on the specific application of the processing system 114 and the overall design constraints.

The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Further, mobility management component 18 (FIG. 1) may be implemented by any one or more of processor 104 and/or computer-readable medium 106. For example, the processor and/or computer-readable medium 106 may be configured to include or perform the functions of mobility management component 18, e.g., to expedite the transmission of a target cell add message to a serving cell.

Figure 6:
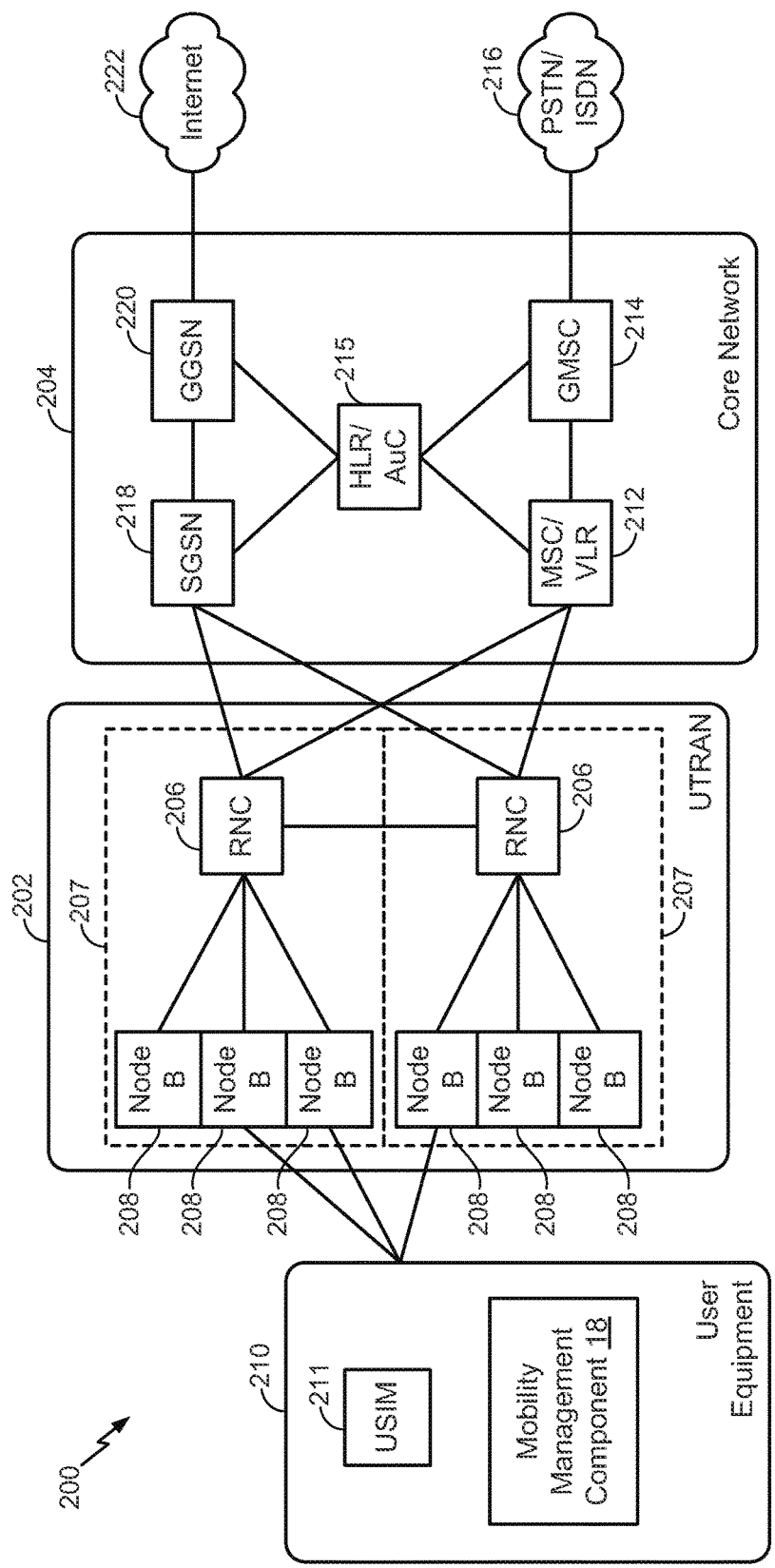
FIG. 6 is a block diagram conceptually illustrating an example of a telecommunications system, in accordance with an aspect of the present disclosure.

The various concepts presented throughout this disclosure may be implemented across a broad variety of telecommunication systems, network architectures, and communication standards. By way of example and without limitation, the aspects of the present disclosure illustrated in FIG. 6 are presented with reference to a UMTS system 200 employing a W-CDMA air interface an including a UE 210 that may be the same as UE 12 (FIG. 1) including mobility management component 18. In particular, UE 210 may include the mobility management component 18 described herein. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses.

Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially pre-coding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially preceding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
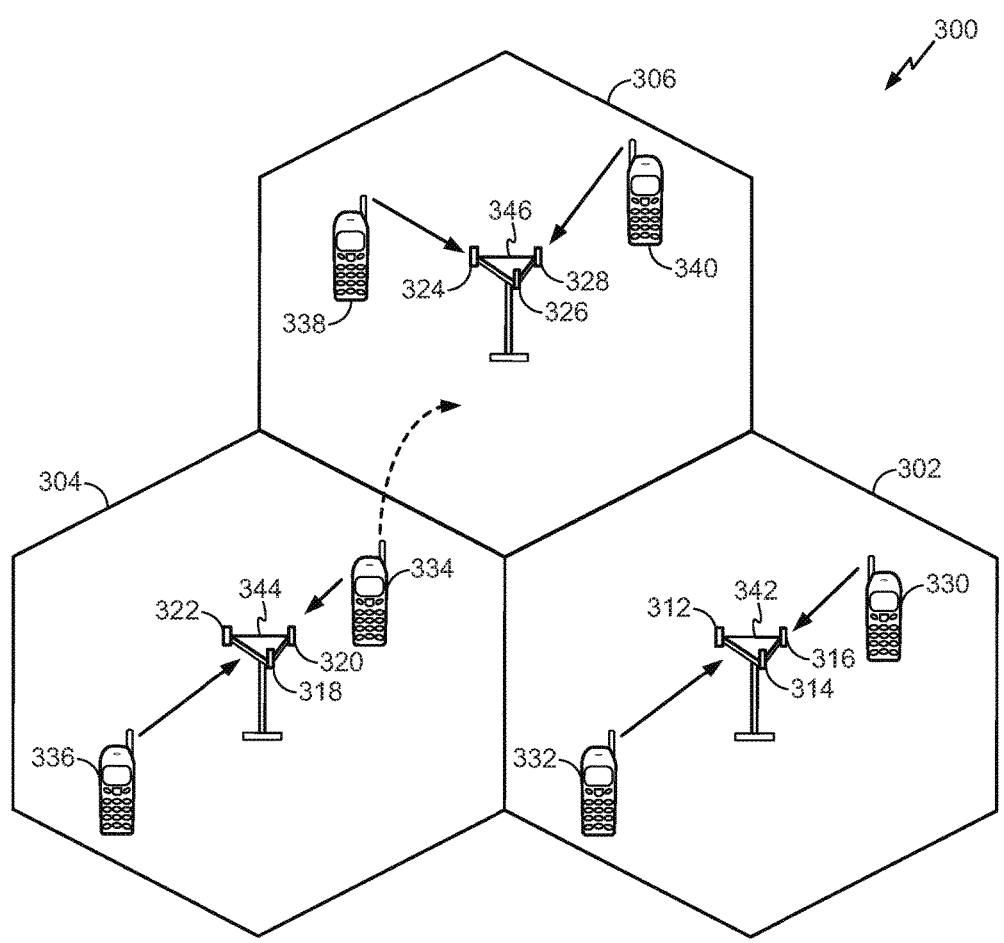
FIG. 7 is a conceptual diagram illustrating an example of an access network in accordance with an aspect of the present disclosure.

Referring to FIG. 7, an access network 300 in a UTRAN architecture is illustrated in which a UE, such as a UE the same as or similar to UE 12 (FIG. 1) including mobility management component 18 may operate. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 2) for all the UEs 330, 332, 334, 336, 338, 340 in the respective cells 302, 304, and 306, and the UEs may be the same as UE 12. In particular, UEs 330, 332, 334, 336, 338, 340 may include the mobility management component 18 described herein.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 7), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 8.

Figure 8:
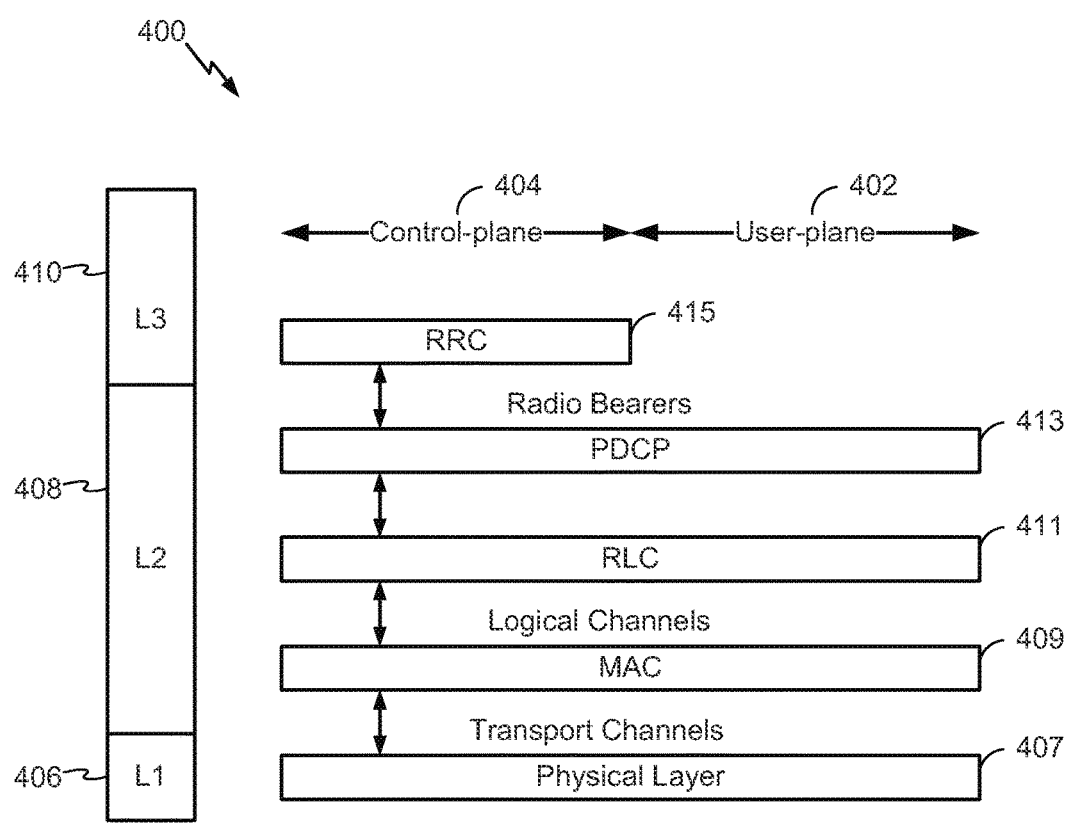
FIG. 8 is a conceptual diagram illustrating an example of a radio protocol architecture for the user and control plane that may be utilized by the user equipment described herein.

Referring to FIG. 8 an example radio protocol architecture 400 relates to the user plane 402 and the control plane 404 of a UE or node B/base station. For example, architecture 400 may be included in a UE such as UE 12 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN. The UE in FIG. 8 may be the same as UE 12. In particular, UE(s) may include the mobility management component 18 described herein.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 9:
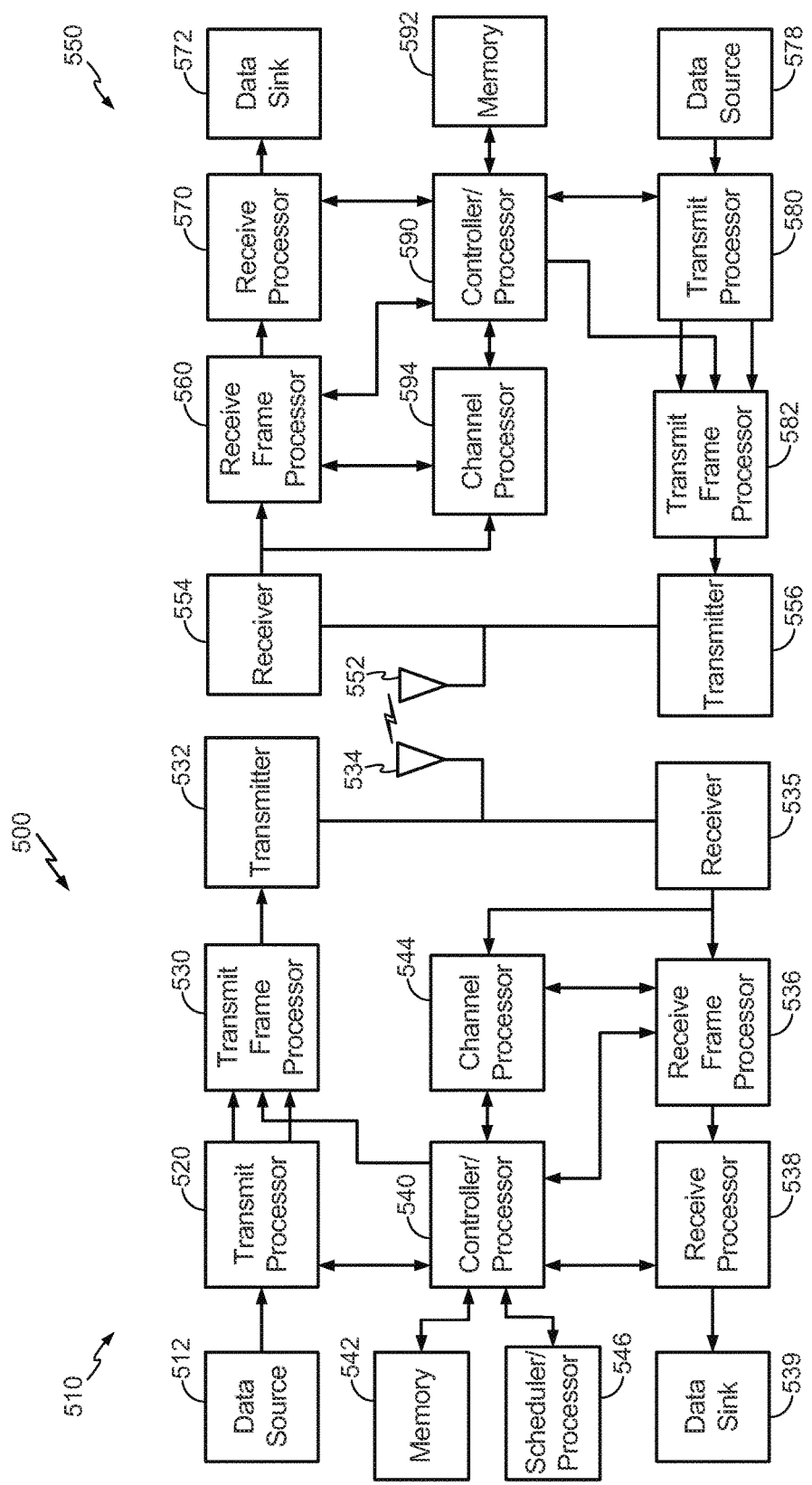
FIG. 9 is a block diagram conceptually illustrating an example of a Node B in communication with a UE in a telecommunications system, wherein the user equipment may be the same as or similar to the user equipment described herein.

FIG. 9 is a block diagram of a Node B 510 in communication with a UE 550, where the Node B 510 may be the Node B 208 in FIG. 6, and the UE 550 may be the UE 210 in FIG. 6, or the UE 12 (FIG. 1) including mobility management component 18. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols.

Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of mobility management, comprising:
   identifying, by a processor of a user equipment (UE), a target cell as an active set candidate;
   calculating, by the processor of the UE, a first filtered measurement of the target cell using a first time constant value;
   calculating, by the processor of the UE, a second filtered measurement of the target cell using a second time constant value that is less than the first time constant value, wherein the first filtered measurement and the second filtered measurement are each a filtered $EcpI_o$ measurement;
   determining, by the processor of the UE, that a trigger adjustment condition exists based on an absolute value of a difference between the first filtered measurement and the second filtered measurement;
   triggering, by the processor of the UE, an adjustment of a timing value that manages a sending time of a target cell add message to a serving cell based on determining that the trigger adjustment condition exists;
   adjusting, by the processor of the UE, the timing value from a first value to a second value based on determining that the trigger adjustment condition exists, wherein the second value of the timing value triggers sending of the target cell add message at an earlier time relative to the first value of the timing value; and
   sending, by a transceiver of the UE, the target cell add message including the target cell to the serving cell based on determining that the trigger adjustment condition exists.

2. The method of claim 1, wherein the timing value comprises at least one of a filtered $EcpI_o$ time constant value, a time to trigger value, or a cell individual offset value.

3. The method of claim 1, wherein determining that the trigger adjustment condition exists further comprises determining that the absolute value is greater than or equal to a difference threshold value.

4. The method of claim 3, further comprising:
   using, by the processor of the UE, the second filtered measurement for determining when to send the target cell add message when the absolute value is greater than or equal to the difference threshold value, wherein the second filtered measurement triggers the sending of the target cell add message at an earlier time relative to a time at which the sending of the target cell add message would be triggered using the first filtered measurement.

5. The method of claim 1, further comprising:
   receiving, at the transceiver of the UE, an active cell update including the target cell in response to sending the target cell add message to the serving cell; and
   adding, by the processor of the UE, the target cell to an active set in response to receiving the active cell update.

6. A non-transitory computer-readable medium, comprising:
   at least one instruction executable to cause a computer to identify a target cell as an active set candidate;
   at least one instruction executable to cause the computer to calculate a first filtered measurement of the target cell using a first time constant value;
   at least one instruction executable to cause the computer to calculate a second filtered measurement of the target cell using a second time constant value that is less than the first time constant value, wherein the first filtered measurement and the second filtered measurement are each a filtered EcpIo measurement;
   at least one instruction executable to cause the computer to determine that a trigger adjustment condition exists based on at least the first filtered measurement and the second filtered measurement;
   at least one instruction executable to cause the computer to trigger an adjustment of a timing value that manages a sending time of a target cell add message to a serving cell based on determining that the trigger adjustment condition exists;
   at least one instruction executable to cause the computer to adjust the timing value from a first value to a second value based on determining that the trigger adjustment condition exists, wherein the second value of the timing value triggers sending of the target cell add message at an earlier time relative to the first value of the timing value; and
   at least one instruction executable to cause the computer to send the target cell add message including the target cell to the serving cell based on determining that the trigger adjustment condition exists.

7. An apparatus for communication, comprising:
   means for identifying a target cell as an active set candidate;
   means for calculating a first filtered measurement of the target cell using a first time constant value;
   means for calculating a second filtered measurement of the target cell using a second time constant value that is less than the first time constant value, wherein the first filtered measurement and the second filtered measurement are each a filtered EcpIo measurement;
   means for determining that a trigger adjustment condition exists based on an absolute value of a difference between the first filtered measurement and the second filtered measurement;
   means for triggering an adjustment of a timing value that manages a sending time of a target cell add message to a serving cell based on determining that the trigger adjustment condition exists;

means for adjusting the timing value from a first value to a second value based on determining that the trigger adjustment condition exists, wherein the second value of the timing value triggers sending of the target cell add message at an earlier time relative to the first value of the timing value; and means for sending the target cell add message including the target cell to the serving cell based on determining that the trigger adjustment condition exists.

8. A user equipment apparatus, comprising:

a memory storing executable instructions; and a processor in communication with the memory, wherein the processor is configured to execute the instructions to:

identify a target cell as an active set candidate;

calculate a first filtered measurement of the target cell using a first time constant value;

calculate a second filtered measurement of the target cell using a second time constant value that is less than the first time constant value, wherein the first filtered measurement and the second filtered measurement are each a filtered EcpIo measurement;

determine that a trigger adjustment condition exists based on an absolute value of a difference between the first filtered measurement and the second filtered measurement;

trigger an adjustment of a timing value that indicates a sending time of a target cell add message to a serving cell based on determining that the trigger adjustment condition exists;

adjust the timing value from a first value to a second value based on determining that the trigger adjustment condition exists, wherein the second value of the timing value triggers sending of the target cell add message at an earlier time relative to the first value of the timing value; and send the target cell add message including the target cell to the serving cell based on determining that the trigger adjustment condition exists.

9. The user equipment apparatus of claim 8, wherein the timing value comprises at least one of a filtered $EcpI_o$ time constant value, a time to trigger value, or a cell individual offset value.

10. The user equipment apparatus of claim 8, wherein to determine that the trigger adjustment condition exists, the processor is further configured to determine that the absolute value is greater than or equal to the difference threshold value.

11. The user equipment apparatus of claim 10, wherein the processor is further configured to execute the instructions to use the second filtered measurement for determining when to send the target cell add message when the absolute value is greater than or equal to the difference threshold value, wherein the second filtered measurement triggers the sending of the target cell add message at an earlier time relative to a time at which the sending of the target cell add message would be triggered using the first filtered measurement.

12. The user equipment apparatus of claim 8, wherein the processor is further configured to execute the instructions to:

receive an active cell update message including the target cell in response to sending the target cell add message to the serving cell; and add the target cell to an active set in response to receiving the active cell update message.

13. The method of claim 1, wherein the timing value is the first time constant value.

14. The user equipment apparatus of claim 8, wherein the timing value is the first time constant value.

15. The method of claim 1, further comprising:

receiving, at the transceiver of the UE, a signal from a base station; and comparing, by the processor of the UE, signal characteristics and/or other information carried by the received signal with a preset or predetermined set of conditions that identify a sufficient candidate to which the UE may be handed over.

* * * * *